United States Patent

[11] 3,580,155

[72] Inventors Wolfgang Zahn
Munich;
Erlich Nagel, Anzing; Reinhold Langer, Munich, Germany
[21] Appl. No. 773,985
[22] Filed Nov. 7, 1968
[45] Patented May 25, 1971
[73] Assignee Agfa-Gevaert Aktiengesellschaft
Leverkusen, Germany
[32] Priority Nov. 16, 1967
[33] Germany
[31] A28727

[54] DRIVING ARRANGEMENT FOR SINGLE BLADE SHUTTER FOR PHOTOGRAPHIC APPARATUS
9 Claims, 2 Drawing Figs.

[52] U.S. Cl. ................................................ 95/53R, 95/58, 95/59, 355/36
[51] Int. Cl. ................................................ G03b 9/10
[50] Field of Search ..................................... 95/10 (C), 58, 59, 53; 355/36

[56] References Cited
UNITED STATES PATENTS

| 703,893 | 7/1902 | Bruck | 95/59 |
| 2,438,303 | 3/1948 | Simmon | 355/36 |
| 3,045,569 | 7/1962 | Booth | 95/10 |
| 3,272,106 | 9/1966 | Czekalla | 95/58 |

Primary Examiner—John M. Horan
Assistant Examiner—T. A. Mauro
Attorney—Michael S. Striker ABSTRACT: A driving arrangement for filters, shutter blades or analogous light-obstructing elements of photographic cameras or photographic printing apparatus comprises an electromagnet having an armature which is turnable within a predetermined angle to turn a one-armed lever which is rigid with the light-obstructing element. The motion transmitting connection between the armature and the lever comprises a gear segment on the armature, a gear provided on an intermediate shaft which carries a crank arm, and a pin-and-slot connection between the crank arm and the lever.

INVENTOR.
WOLFGANG ZAHN
ERICH NAGEL
REINHOLD LANGER

DRIVING ARRANGEMENT FOR SINGLE BLADE SHUTTER FOR PHOTOGRAPHIC APPARATUS

BACKGROUND OF THE INVENTION

The present invention relates to driving arrangements in general, and more particularly to improvements in driving arrangements which are especially suited for controlling and effecting movements of shutter blades, color filters and/or analogous light-obstructing elements in photographic apparatus, for example, in cameras or in photographic printers or copiers.

It is already known to move the shutter blade or blades, the filter or filters or analogous light-obstructing elements of a photographic printing or copying apparatus by a rotary electromagnet. As a rule, the light-obstructing element is affixed directly to the rotary armature of the electromagnet so that the angular displacement of the armature is always identical with angular displacement of the light-obstructing element. This is not satisfactory in certain types of printing apparatus, particularly in photographic roller copiers which are employed for the production of color prints. In such apparatus, a color filter must be moved across the path of printing light for very short periods of time and, in order to insure such rapid displacement of the filter to light-obstructing or operative position, the apparatus must employ exceptionally strong rotary electromagnets. Only a strong electromagnet can insure satisfactory acceleration of a filter into or away from the light path. It is particularly important to insure rapid withdrawal of a color filter from the path of printing light upon completion of an exposure to light in a particular color when the exposure time s determined by photoelectric means. This will be readily understood since, if the filter dwells in operative position only a little longer than desirable, such overexposure in a particular color can effect the color balance of the print.

A drawback of very strong and hence bulky rotary electromagnets is that their inertia is excessive, mainly due to the long interval of time which is required to build up a satisfactory magnetic field. In other words, the acceleration of a filter or shutter blade cannot be increased infinitely by the mere expedient of employing larger and stronger electromagnets. On the other hand, rapid acceleration of color filters is very desirable, particularly in modern high-speed photographic printing apparatus. Additional problems arise due to the fact that many filters consist of vitreous material which cannot stand excessive thermal and/or mechanical stresses. This is another reason why the acceleration and deceleration of such filters cannot be selected at will.

SUMMARY OF THE INVENTION

One object of our invention is to provide a novel and improved driving arrangement for light-obstructing elements of photographic apparatus, particularly for the shutter blades and/or filters of photographic printing apparatus, and to construct and assemble the arrangement in such a way that satisfactory acceleration of light-obstructing elements to or from operative positions can be achieved by resorting to a relatively small and weak rotary electromagnet.

Another object of the invention is to provide a driving arrangement wherein the rate at which the light-obstructing element or elements are accelerated can be regulated or selected at will to prevent excessive acceleration or deceleration and eventual damage to movable parts.

A further object of the invention is to provide a compact driving arrangement which can be built into existing photographic apparatus with minimal alterations.

The improved driving arrangement comprises an electromagnet having an armature which is rotatable within a predetermined angle in response to energization and deenergization of the electromagnet, a carrier which preferably constitutes a one-armed lever and is pivotable about a fixed axis parallel to the axis of the armature, an arm turnable by the armature between two end positions about a second fixed axis which is preferably parallel to the axes of the carrier and arm- mature, and a pin-and-slot connection between the arm and the carrier. At least one end position preferably corresponds to a dead center position of the arm and the aforementioned connection preferably comprises an elongated slot provided in and extending radially of the axis of the carrier. It is further advisable to interpose a transmission between the armature and the arm; such transmission may include a gear train which comprises a gear segment rigid with the armature and a gear rigid with the arm and meshing with the segment.

It is further advisable to provide a helical spring or analogous biasing means for permanently urging the arm to one of its end positions. Such spring can operate between the armature and a support for the electromagnet.

The novel features which are considered as characteristic of the invention are set forth in particular in the appended claims. The improved driving arrangement itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 1:
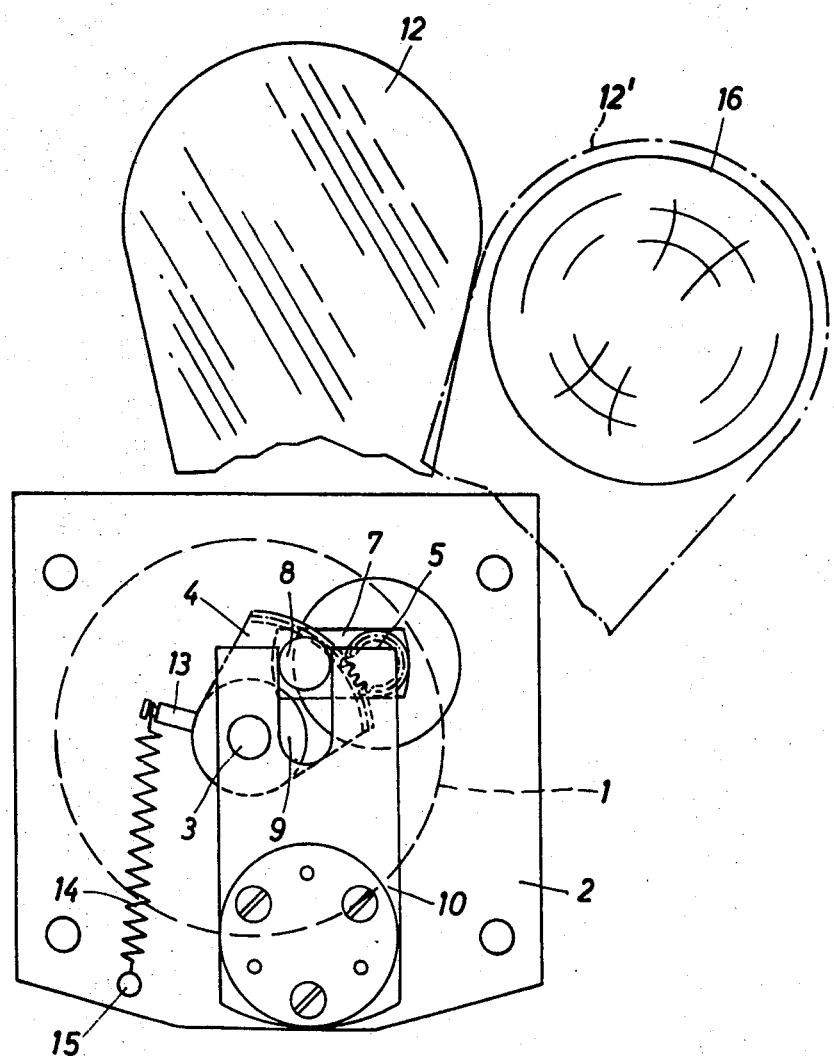
FIG. 1 is a front elevational view of a driving arrangement which embodies the invention, a movable light-obstructing element being indicated in a second position by phantom lines.
Figure 2:
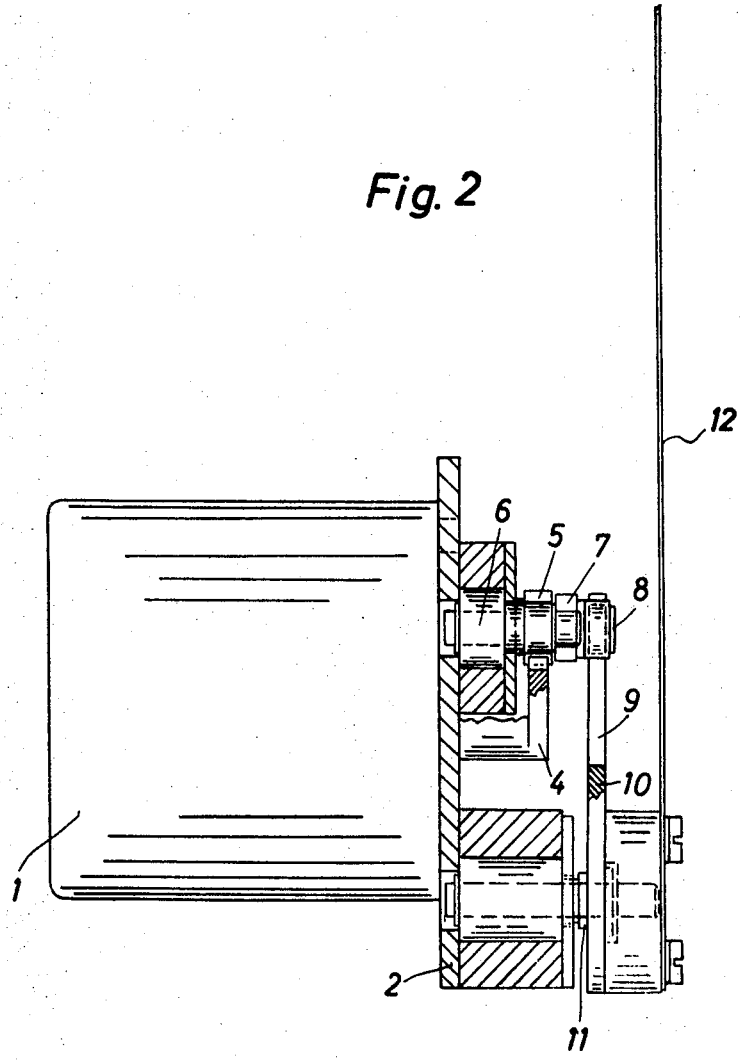
FIG. 2 is a partly side elevational and partly sectional view as seen from the left-hand side of FIG. 1.

The numeral 1 denotes a rotary electromagnet of conventional design which is affixed to a platelike support 2 by screws or analogous fasteners. The armature of the electromagnet 1 comprises a shaft 3 which carries a gear here shown as a segment 4. The latter can be a press-fit or clamped on the shaft 3 and is in mesh with a gear 5 which is provided on or forms an integral part of a second shaft 6 journaled in the support 2. The shaft 6 carries a crank arm 7 provided with a crank pin 8. The latter can be riveted to the crank arm 7, and the same holds true for the connection between the crank arm and the shaft 6. The crank pin 8 extends into an elongated straight slot 9 provided in a carrier 10 here shown as a one-armed lever which is turnable about the axis of a shaft 11. The latter is rigid with the carrier 10 and is rotatable in the support 2. The carrier 10 is rigid with a light-obstructing element 12 here shown a shutter blade. When pivoted to the phantom-line operative position 12' of FIG. 1, the free end portion of the blade 12 obstructs the passage of printing light through an opening or window 16. The latter is provided in a photographic printing or copying apparatus the details of which form no part of the present invention.

The gear segment 4 carries a post 13 which is connected with one end convolution of a helical return spring 14. The other end convolution of the spring 14 is attached to a second post 15 on the support 2. The purpose of the spring 14 is to permanently urge the shutter blade 12 to the solid-line inoperative position of FIG. 1, i.e., this blade assumes such position when the electromagnet 1 is deenergized. The axes of the shafts 3, 6 and 11 are parallel to each other.

The operation of the just described driving arrangement is as follows: When the electromagnet 1 is deenergized, the parts of the driving arrangement assume the positions shown by solid lines. Thus, the blade 12 does not obstruct the passage of printing light through the window 16 and the printing apparatus is ready to carry out a copying operation. When the printing apparatus or the person in charge produces a signal to terminate the exposure, the electromagnet 1 is energized and the shaft 3 of its armature turns the gear segment 4 in a clockwise direction, as viewed in FIG. 1, whereby the segment 4 turns the gear 5, shaft 6, crank arm 7 and crank pin 8 in a counterclockwise direction. The pin 8 travels downwardly along the slot 9 and turns the carrier 10 and shaft 11 in a clockwise direction so that the shutter blade 12 is moved to the operative or light-obstructing position 12' and prevents further passage of printing light through the window 16. This completes the exposure. Prior to start of the next exposure, the electromagnet 1 is deenergized so that the spring 14 is free to dissipate energy and to rapidly return the blade 12 to the solid-line position of FIG. 1. Such return movement of the blade 12 is effected by way of the gear segment 4, gear 5, shaft 6, crank arm 7, crank pin 8, carrier 10 and shaft 11.

The transmission including the gear segment 4 and gear 5 serves mainly to insure that the blade 12 turns through an angle of desired magnitude in response to angular displacement of the shaft 3 on energization or deenergization of the electromagnet 1. The angular displacement of the shaft 3 is determined in advance and the ratio of the transmission 4, 5 can be readily selected in such a way that such predetermined angular displacement of the shaft 3 brings about a desired angular displacement of the blade 12. It is clear that, at least in some instances, the crank arm 7 can be affixed directly to the armature shaft 3 or that the transmission between the crank arm 7 and the armature shaft 3 may include a link train, a train of friction wheels or an analogous transmission.

Since the slot 9 of the carrier 10 extends in the radial direction of the shaft 11, acceleration of the blade 12 is the same regardless of whether the blade is moved by the electromagnet 1 or by the return spring 14. However, it is equally within the purview of our invention to employ a carrier whose slot does not extend exactly radially with reference to the pivot axis of the carrier or a carrier which is provided with an L-shaped, S-shaped or otherwise configurated slot for the crank pin 8. For example, such modified carriers can be employed if it is desirable to insure a specific acceleration of the blade, either at the start or during another stage of movement of the blade to or from light-obstructing position.

The motion transmitting connection between the armature shaft 3 and the carrier 10 is preferably such that the blade 12 is arrested in at least one dead center position of the crank arm 7, namely, when the line connecting the axes of the shaft 6 and crank pin 8 is exactly normal to the line connecting the axes of the shaft 11 and crank pin 8 (inoperative position of the blade 12), and when the axes of the shafts 6, 11 and crank pin 8 are located in a common plane (operative position of the blade 12). When the electromagnet 1 is energized, the crank arm 7 leaves the illustrated position and is gradually accelerated to bring about gradual acceleration of the blade 12 toward operative position. This insures a substantially sinusoidal progress of movement of the blade at the start of which the motion transmitting parts act as a stepdown transmission. It was found that our driving arrangement can complete the movement of the blade 12 to either of its positions within a very short interval of time and that, since at least one end position of the blade corresponds to a dead center position of the crank arm 7, the driving arrangement need not be provided with any separate arresting or braking devices which are needed in presently known driving arrangements to prevent sudden impact on stoppage of blade or excessive stressing of a filter when the shaft 11 is arranged to pivot a filter instead of a blade.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended.

We claim:
1. A driving arrangement, particularly for effecting movements of light-obstructing elements in photographic apparatus, comprising an electromagnet having an armature rotatable within a predetermined angle in response to energization and deenergization of the electromagnet; a carrier pivotable about a fixed axis and arranged to support and to transmit motion to a light-obstructing element; an arm turnable by said armature between two end positions; and a connection between said arm and said carrier including a slot provided in said carrier and extending substantially radially of said fixed axis and a pin provided on said arm and extending into said slot.

2. A driving arrangement, particularly for effecting movements of light-obstructing elements in photographic apparatus, comprising an electromagnet having an armature rotatable within a predetermined angle in response to energization and deenergization of the electromagnet; a carrier pivotable about a fixed axis and arranged to support and to transmit motion to a light-obstructing element; an arm turnable by said armature about a second fixed axis between two end positions; a pin-and-slot connection between said arm and said carrier; and a transmission interposed between said armature and said arm, said transmission comprising a gear train having a gear segment rigid with said armature and a gear meshing with said segment and fixed to said arm for rotation about said second fixed axis.

3. A driving arrangement, particularly for effecting movement of light-obstructing elements in photographic apparatus, comprising an electromagnet having an armature rotatable within a predetermined angle in response to energization and deenergization of the electromagnet; a carrier pivotable about a fixed axis and arranged to support and to transmit motion to a light-obstructing element; an arm turnable by said armature between two end positions; and a pin-and-slot connection between said arm and said carrier, said arm being pivotable about an axis which is parallel to said fixed axis and to the axis of said armature.

4. A driving arrangement, particularly for effecting movements of light-obstructing elements in photographic apparatus, comprising an electromagnet having an armature rotatble within a predetermined angle in response to energization and deenergization of the electromagnet a carrier pivotable about a fixed axis and arranged to support and to transmit motion to a light-obstructing element; an arm turnable by said armature between two end positions; and a pin-and-slot connection between said arm and said carrier, at least one of said end positions of said arm being a dead center position in which a line connecting the axis of the pin of said connection with the axis of said carrier makes with a line connecting the axes of said pin and said arm an angle of $n$ times $90°$ wherein $n$ is a whole number including one.

5. A driving arrangement as defined in claim 4, further comprising a transmission interposed between said armature and said arm.

6. A driving arrangement as defined in claim 5, wherein said transmission comprises a gear train.

7. A driving arrangement as defined in claim 4, further comprising means for permanently biasing said arm to one of said end positions thereof.

8. A driving arrangement as defined in claim 7, further comprising support means for said electromagnet, said carrier and said arm, said biasing means comprising spring means operating between said armature and said support means.

9. A driving arrangement as defined in claim 4, further comprising resilient means arranged to oppose rotation of said armature in response to energization of said electromagnet.